US011916314B2

(12) United States Patent
Lin et al.

(10) Patent No.: US 11,916,314 B2
(45) Date of Patent: Feb. 27, 2024

(54) MOBILE DEVICE

(71) Applicant: HTC Corporation, Taoyuan (TW)

(72) Inventors: Cheng-Hung Lin, Taoyuan (TW); Szu-Po Wang, Taoyuan (TW); Chia-Te Chien, Taoyuan (TW); Chun-Chieh Wang, Taoyuan (TW); Kang-Ling Li, Taoyuan (TW); Chun-Hsien Lee, Taoyuan (TW); Yu-Chieh Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 65 days.

(21) Appl. No.: 17/742,710

(22) Filed: May 12, 2022

(65) Prior Publication Data

US 2023/0369764 A1 Nov. 16, 2023

(51) Int. Cl.
*H01Q 9/04* (2006.01)
*H01Q 15/00* (2006.01)
*H01Q 5/35* (2015.01)

(52) U.S. Cl.
CPC ............. *H01Q 9/0414* (2013.01); *H01Q 5/35* (2015.01); *H01Q 15/002* (2013.01)

(58) Field of Classification Search
CPC ....... H01Q 9/0414; H01Q 5/35; H01Q 15/002
See application file for complete search history.

(56) References Cited

U.S. PATENT DOCUMENTS 9,153,867 B2 10/2015 Kim et al.
2002/0080088 A1* 6/2002 Boyle .................... H01Q 11/04 343/895
2004/0263394 A1* 12/2004 Harano ................ H01Q 19/005 343/700 MS

FOREIGN PATENT DOCUMENTS

| | | | | |
|---|---|---|---|---|
| KR | 20100041554 | A | * | 4/2010 |
| TW | 573380 | B | | 1/2004 |
| TW | 201436367 | A | | 9/2014 |
| TW | 201442330 | A | | 11/2014 |
| WO | WO2021/171997 | A1 | | 9/2021 |

* cited by examiner

*Primary Examiner* — Dieu Hien T Duong
(74) *Attorney, Agent, or Firm* — Birch, Stewart, Kolasch & Birch, LLP

(57) ABSTRACT

A mobile device includes a housing, a first radiation element, a second radiation element, a third radiation element, a first switch element, and a second switch element. The first radiation element has a first feeding point. The second radiation element has a second feeding point. The first radiation element, the second radiation element, and the third radiation element are distributed over the housing. The first switch element is closed or open, so as to selectively couple the first radiation element to the third radiation element. The second switch element is closed or open, so as to selectively couple the second radiation element to the third radiation element. An antenna structure is formed by the first radiation element, the second radiation element, and the third radiation element.

20 Claims, 5 Drawing Sheets

300

500

MOBILE DEVICE

BACKGROUND OF THE INVENTION

Field of the Invention

The disclosure generally relates to a mobile device, and more particularly, it relates to a mobile device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz Some devices cover a small wireless communication area; these include mobile phones using Wi-Fi and Bluetooth systems and using frequency bands of 2.4 GHz, 5.2 GHz, and 5.8 GHz.

Antennas are indispensable elements for wireless communication. If an antenna used for signal reception and transmission has insufficient bandwidth, it will tend to degrade the communication quality of the mobile device. Accordingly, it has become a critical challenge for antenna designers to design a small-size and wideband antenna element.

BRIEF SUMMARY OF THE INVENTION

In a preferred embodiment, the disclosure is directed to a mobile device that includes a housing, a first radiation element, a second radiation element, a third radiation element, a first switch element, and a second switch element. The first radiation element has a first feeding point. The second radiation element has a second feeding point. The first radiation element, the second radiation element, and the third radiation element are distributed over the housing. The first switch element is closed or open, so as to selectively couple the first radiation element to the third radiation element. The second switch element is closed or open, so as to selectively couple the second radiation element to the third radiation element. An antenna structure is formed by the first radiation element, the second radiation element, and the third radiation element.

In some embodiments, the housing includes a back cover and a sidewall. The back cover and the sidewall are substantially perpendicular to each other.

In some embodiments, the first radiation element, the second radiation element, and the third radiation element are mainly disposed on the sidewall.

In some embodiments, the sidewall has a plurality of openings.

In some embodiments, the first radiation element, the second radiation element, and the third radiation element are substantially interleaved with the openings of the sidewall.

In some embodiments, each of the first radiation element and the second radiation element has an inverted U-shape or a meandering shape.

In some embodiments, the third radiation element has an M-shape.

In some embodiments, the first radiation element includes an H-shaped portion, the second radiation element includes a C-shaped portion, and the third radiation element includes a T-shaped portion.

In some embodiments, the third radiation element includes a first segment and a second segment. The first segment is coupled to the first switch element. The second segment is coupled to the second switch element.

In some embodiments, each of the first segment and the second segment has an inverted U-shape.

In some embodiments, the mobile device further includes a third switch element. The third switch element is closed or open, so as to selectively couple the first segment to the second segment.

In some embodiments, the first segment or the second segment further has a third feeding point.

In some embodiments, when the first switch element, the second switch element, and the third switch element are all closed, the antenna structure covers a first frequency band, a second frequency band, a third frequency band, and a fourth frequency band.

In some embodiments, the first frequency band is from 600 MHz to 1000 MHz.

In some embodiments, the second frequency band is from 1400 MHz to 2700 MHz.

In some embodiments, the third frequency band is from 3200 MHz to 5000 MHz.

In some embodiments, the fourth frequency band is from 5000 MHz to 7200 MHz.

In some embodiments, when only any two of the first switch element, the second switch element, and the third switch element are closed, the antenna structure covers a second frequency band, a third frequency band, and a fourth frequency band.

In some embodiments, when only any one of the first switch element, the second switch element, and the third switch element is closed, the antenna structure covers a third frequency band and a fourth frequency band.

In some embodiments, when the first switch element, the second switch element, and the third switch element are all opened, the antenna structure covers a fourth frequency band.

In some embodiments, the mobile device further includes a dielectric substrate. The first switch element, the second switch element, and the third switch element are disposed on the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
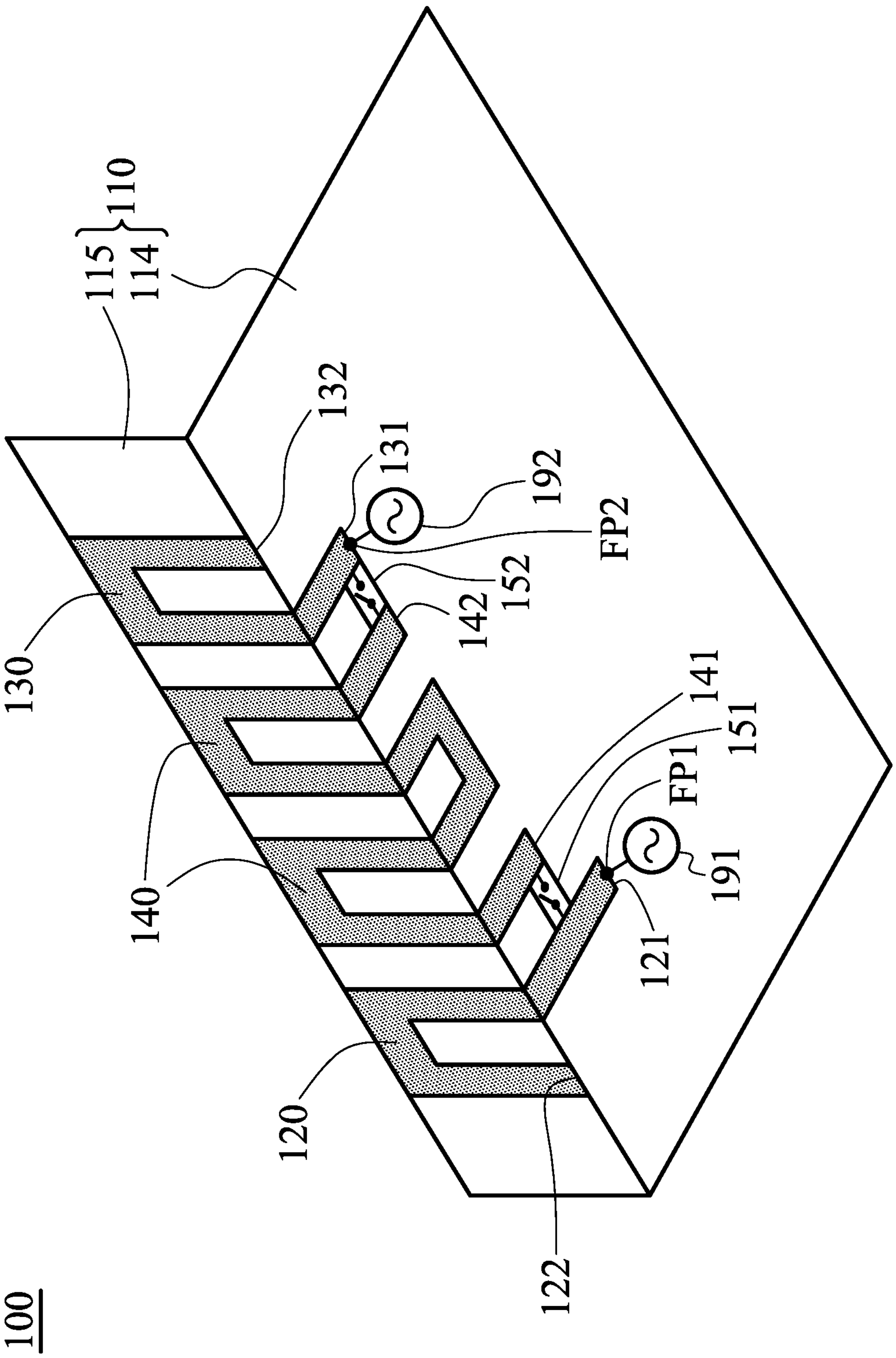
FIG. 1 is a diagram of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a mobile device 100 according to an embodiment of the invention. For example, the mobile device 100 may be a smart phone, a tablet computer, or a notebook computer. In the embodiment of FIG. 1, the mobile device 100 includes a housing 110, a first radiation element 120, a second radiation element 130, a third radiation element 140, a first switch element 151, and a second switch element 152. The first radiation element 120, the second radiation element 130, and the third radiation element 140 may all be made of metal materials, such as silver, copper, aluminum, iron, or their alloys. It should be understood that the mobile device 100 may further include other components, such as a processor, a touch control panel, a speaker, an RF (Radio Frequency) module, and/or a power supply module, although they are not displayed in FIG. 1.

The housing 110 includes a back cover 114 and a sidewall 115. The back cover 114 and the sidewall 115 may be substantially perpendicular to each other. The first radiation element 120, the second radiation element 130, and the third radiation element 140 are all distributed over the housing 110. For example, the first radiation element 120, the second radiation element 130, and the third radiation element 140 are mainly disposed on the sidewall 115, but they are not limited thereto. In some embodiments, the housing 110 is made of a nonconductive material, and the first radiation element 120, the second radiation element 130, and the third radiation element 140 are formed on the housing 110 by using LDS (Laser Direct Structuring) technology. In alternative embodiments, the housing 110 is made of a metal material, and the first radiation element 120, the second radiation element 130, and the third radiation element 140 are integrated with the housing 110. In addition, the first radiation element 120, the second radiation element 130, and the third radiation element 140 may be further attached to a plastic injection element (not shown).

The first radiation element 120 may substantially have an inverted U-shape. Specifically, the first radiation element 120 has a first end 121 and a second end 122. A first feeding point FP1 is positioned at the first end 121 of the first radiation element 120. The second end 122 of the first radiation element 120 is an open end. The first feeding point FP1 may be further coupled to a first signal source 191.

The second radiation element 130 may substantially have another inverted U-shape. Specifically, the second radiation element 130 has a first end 131 and a second end 132. A second feeding point FP2 is positioned at the first end 131 of the second radiation element 130. The second end 132 of the second radiation element 130 is an open end. The second feeding point FP2 may be further coupled to a second signal source 192.

The third radiation element 140 may substantially have an M-shape. Specifically, the third radiation element 140 has a first end 141 and a second end 142. A terminal of the first switch element 151 is coupled to the first end 121 of the first radiation element 120, and another terminal of the first switch element 151 is coupled to the first end 141 of the third radiation element 140. The first switch element 151 is closed or open, so as to selectively couple the first radiation element 120 to the third radiation element 140. A terminal of the second switch element 152 is coupled to the first end 131 of the second radiation element 130, and another terminal of the second switch element 152 is coupled to the second end 142 of the third radiation element 140. The second switch element 152 is closed or open, so as to selectively couple the second radiation element 130 to the third radiation element 140. In some embodiments, the first switch element 151 and the second switch element 152 are controlled by a processor according to a user input, but they are not limited thereto.

It should be noted that an antenna structure of the mobile device 100 is formed by the first radiation element 120, the second radiation element 130, and the third radiation element 140. The length of the resonant path of the antenna structure can be adjusted by controlling the closed or open states of the first switch element 151 and the second switch element 152. Therefore, the antenna structure of the mobile device 100 can cover multiple operational frequency bands. Since the first radiation element 120, the second radiation element 130, and the third radiation element 140 are appropriately integrated with the housing 110, the whole size of the antenna structure of the mobile device 100 can be further minimized. Furthermore, the mobile device 100 can support MIMO (Multi-Input and Multi-Output) operations because the first feeding point FP1 and the second feeding point FP2 are both used.

The following embodiments will introduce different configurations and detailed structural features of the mobile device 100. It should be understood that these figures and descriptions are merely exemplary, rather than limitations of the invention.

Figure 2:
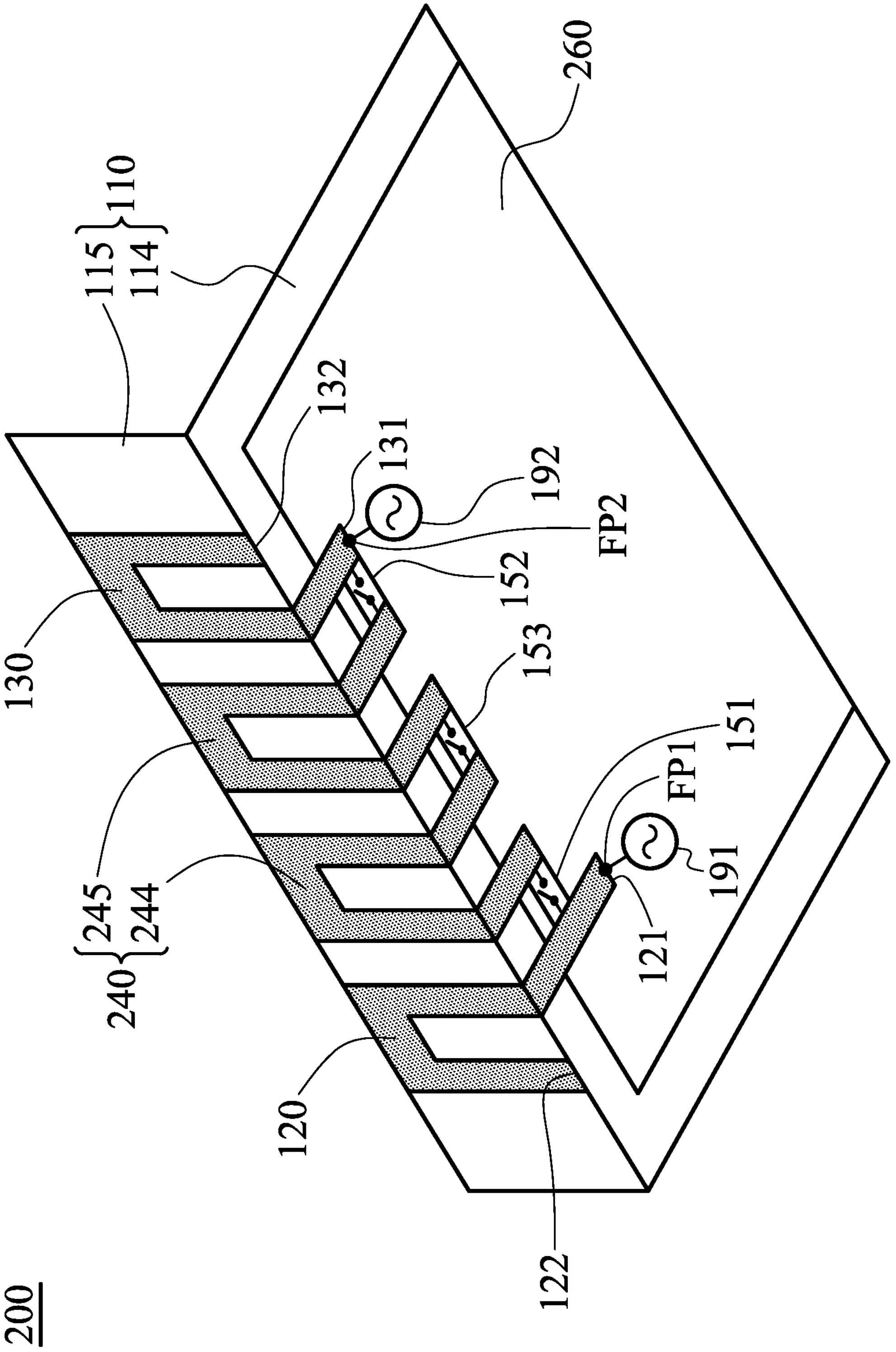
FIG. 2 is a diagram of a mobile device according to an embodiment of the invention.

FIG. 2 is a diagram of a mobile device 200 according to an embodiment of the invention. FIG. 2 is similar to FIG. 1. In the embodiment of FIG. 2, a third radiation element 240 of the mobile device 200 includes a first segment 244 and a second segment 245. The first segment 244 is coupled to the first switch element 151. The second segment 245 is coupled to the second switch element 152. For example, each of the first segment 244 and the second segment 245 may substantially have an inverted U-shape, but it is not limited thereto. In addition, the mobile device 200 further includes a third switch element 153. A terminal of the third switch element 153 is coupled to the first segment 244, and another terminal of the third switch element 153 is coupled to the second segment 245. The third switch element 153 is closed or open, so as to selectively couple the first segment 244 to the second segment 245. As mentioned above, the antenna structure of the mobile device 200 can cover more operational frequency bands by controlling the first switch element 151, the second switch element 152, and the third switch element 153 to adjust the length of the effective resonant path. In some embodiments, the mobile device 200 further includes a dielectric substrate 260, which may be an FR4 (Flame Retardant 4) substrate or a PCB (Printed Circuit Board). The first switch element 151, the second switch element 152, and the third switch element 153, the first signal source 191, and the second signal source 192 may all be disposed on the dielectric substrate 260. In alternative embodiments, the first radiation element 120, the second radiation element 130, and the third radiation element 240 are at least partially disposed on the dielectric substrate 260, so that they can be easily coupled to the first switch element 151, the second switch element 152, the third switch element 153, the first signal source 191, and the second signal source 192. Other features of the mobile device 200 of FIG. 2 are similar to those of the mobile device 100 of FIG. 1. Therefore, the two embodiments can achieve similar levels of performance.

Figure 3:
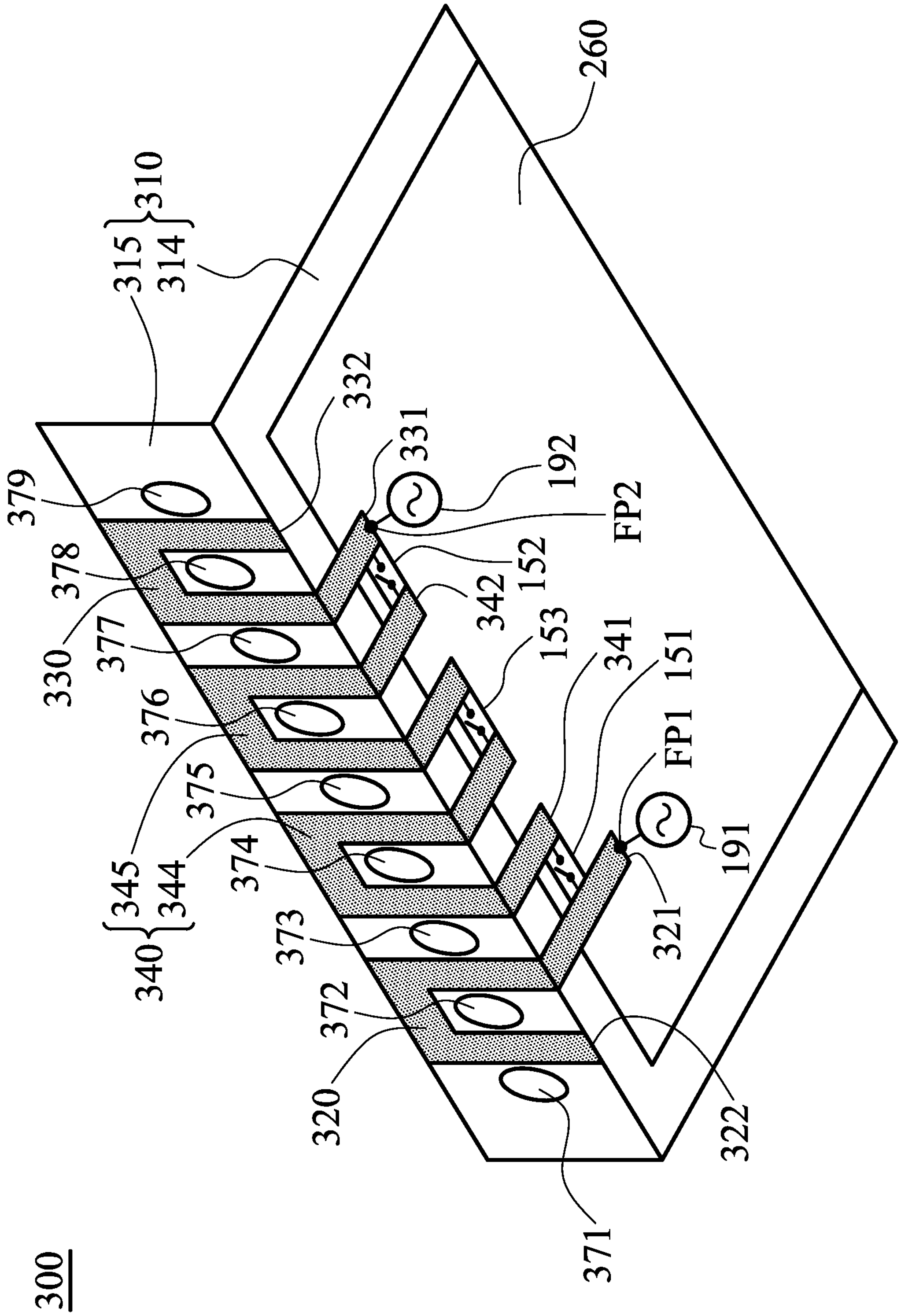
FIG. 3 is a diagram of a mobile device according to an embodiment of the invention.

FIG. 3 is a diagram of a mobile device 300 according to an embodiment of the invention. FIG. 3 is similar to FIG. 1. In the embodiment of FIG. 3, the mobile device 300 includes a housing 310, a first radiation element 320, a second radiation element 330, a third radiation element 340, a first switch element 151, a second switch element 152, a third switch element 153, and a dielectric substrate 260. For example, the housing 310 may be made of a nonconductive material, and it may include a back cover 314 and a sidewall 315. The sidewall 315 has a plurality of openings 371, 372, 373, 374, 375, 376, 377, 378 and 379, which may be arranged in a straight line. For example, each of the openings 371, 372, 373, 374, 375, 376, 377, 378 and 379 may substantially have a circular shape, an elliptical shape, or a square shape. In some embodiments, the openings 371, 372, 373, 374, 375, 376, 377, 378 and 379 may be speaker openings or microphone openings, but they are not limited thereto. It should be understood that the number and arrangement of the openings 371, 372, 373, 374, 375, 376, 377, 378 and 379 are adjustable in response to different requirements.

The first radiation element 320 may substantially have a meandering shape, and it may be interleaved with the openings 371 and 372 of the sidewall 315. Specifically, the first radiation element 320 has a first end 321 and a second end 322. A first feeding point FP1 is positioned at the first end 321 of the first radiation element 320. The second end 322 of the first radiation element 320 is an open end. The second radiation element 330 may substantially have another meandering shape, and it may be interleaved with the openings 378 and 379 of the sidewall 315. Specifically, the second radiation element 330 has a first end 331 and a second end 332. A second feeding point FP2 is positioned at the first end 331 of the second radiation element 330. The second end 332 of the second radiation element 330 is an open end. For example, the second end 332 of the second radiation element 330 and the second end 322 of the first radiation element 320 may substantially extend in opposite directions and away from each other.

The third radiation element 340 may substantially have an M-shape, and it may be interleaved with the openings 373, 374, 375, 376 and 377 of the sidewall 315. Specifically, the third radiation element 340 has a first end 341 and a second end 342, and includes a first segment 344 adjacent to the first end 341 and a second segment 345 adjacent to the second end 342. The first segment 344 at least partially surrounds the opening 374. The second segment 345 at least partially surrounds the opening 376. The opening 375 is positioned between the first segment 344 and the second segment 345. A terminal of the first switch element 151 is coupled to the first end 321 of the first radiation element 320, and another terminal of the first switch element 151 is coupled to the first segment 344. A terminal of the second switch element 152 is coupled to the first end 331 of the second radiation element 330, and another terminal of the second switch element 152 is coupled to the second segment 345. A terminal of the third switch element 153 is coupled to the first segment 344, and another terminal of the third switch element 153 is coupled to the second segment 345.

In some embodiments, the antenna structure of the mobile device 100 can cover multiple frequency bands by controlling the closed or open state of the first switch element 151, the second switch element 152, and the third switch element 153. Specifically, when the first switch element 151, the second switch element 152, and the third switch element 153 are all closed, the antenna structure with the longest resonant length can cover a first frequency band, a second frequency band, a third frequency band, and a fourth frequency band. When only any two of the first switch element 151, the second switch element 152, and the third switch element 153 are closed (e.g., the first switch element 151 and the third switch element 153 may be closed, but the second switch element 152 may be opened), the antenna structure can merely cover the second frequency band, the third frequency band, and the fourth frequency band. When only any one of the first switch element 151, the second switch element 152, and the third switch element 153 is closed (e.g., the first switch element 151 may be closed, but the second switch element 152 and the third switch element 153 may be opened), the antenna structure can merely cover the third frequency band and the fourth frequency band. When the first switch element 151, the second switch element 152, and the third switch element 153 are all opened, the antenna structure with the shortest resonant length can cover only the fourth frequency band. It should be noted that any radiation element, which is not in use, can increase the isolation between the other radiation elements. For example, the first frequency band may be from 600 MHz to 1000 MHz, the second frequency band may be from 1400 MHz to 2700 MHz, the third frequency band may be from 3200 MHz to 5000 MHz, and the fourth frequency band may be from 5000 MHz to 7200 MHz. Accordingly, the antenna structure of the mobile device 300 can support the wideband operations of the next 5G (5th Generation Wireless System). However, the invention is not limited thereto. In alternative embodiments, the antenna structure of the mobile device 300 can cover the operational frequency bands of LTE (Long Term Evolution), GPS (Global Positioning System), or Wi-Fi 6E. Other features of the mobile device 300 of FIG. 3 are similar to those of the mobile device 100 of FIG. 1. Therefore, the two embodiments can achieve similar levels of performance.

Figure 4:
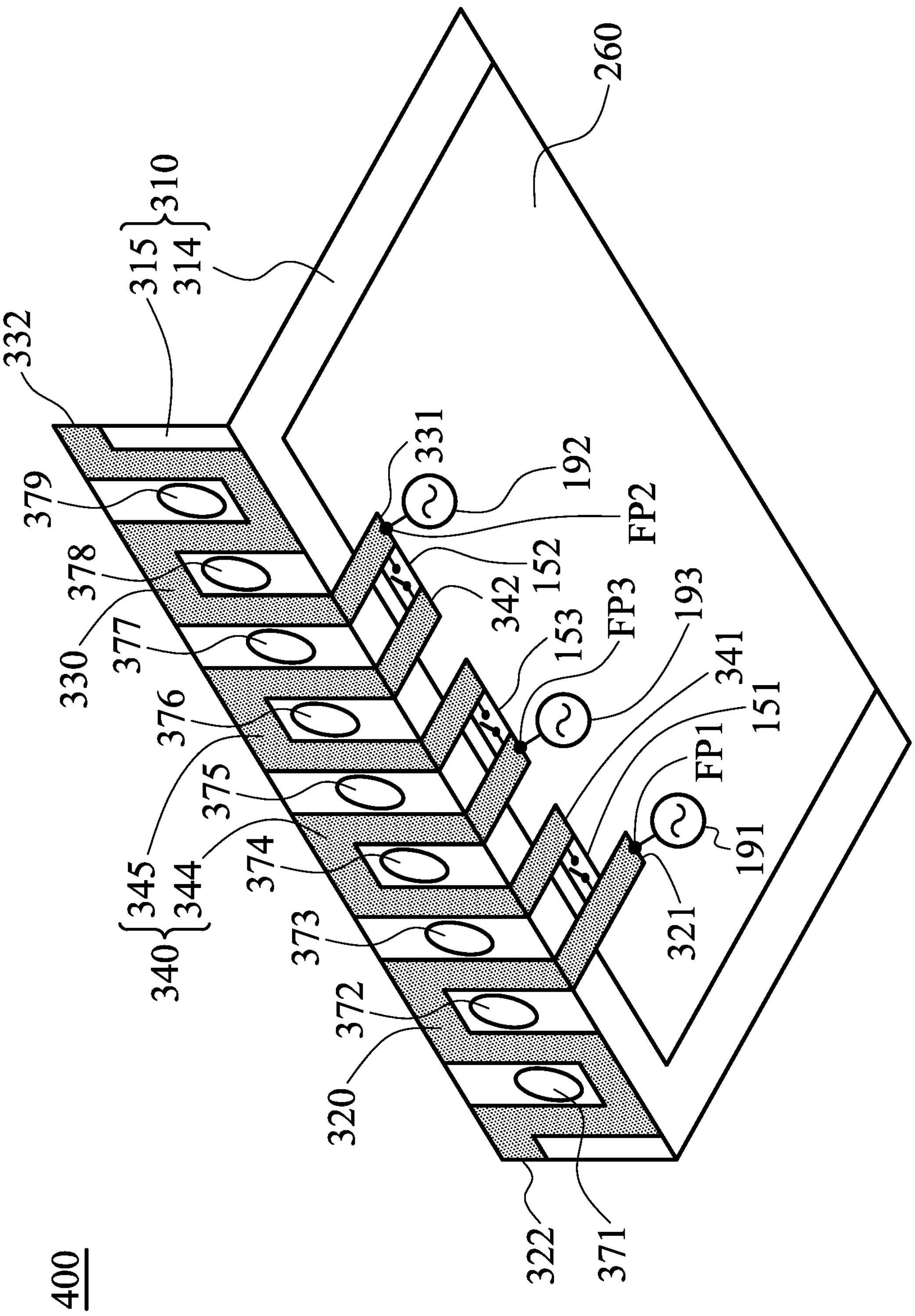
FIG. 4 is a diagram of a mobile device according to an embodiment of the invention.

FIG. 4 is a diagram of a mobile device 400 according to an embodiment of the invention. FIG. 4 is similar to FIG. 3. In the embodiment of FIG. 4, the first segment 344 or the second segment 345 of the third radiation element 340 further has a third feeding point FP3, which may be further coupled to a third signal source 193. Thus, the mobile device 400 can support more complex MIMO operations. Furthermore, the lengths of the first radiation element 320 and the second radiation element 330 may be further extended in comparison to FIG. 3. Based on different use requirements, the mobile device 400 may have more feeding points, and it may be used together with more switch elements and more signal sources. Other features of the mobile device 400 of FIG. 4 are similar to those of the mobile device 300 of FIG. 3. Therefore, the two embodiments can achieve similar levels of performance.

Figure 5:
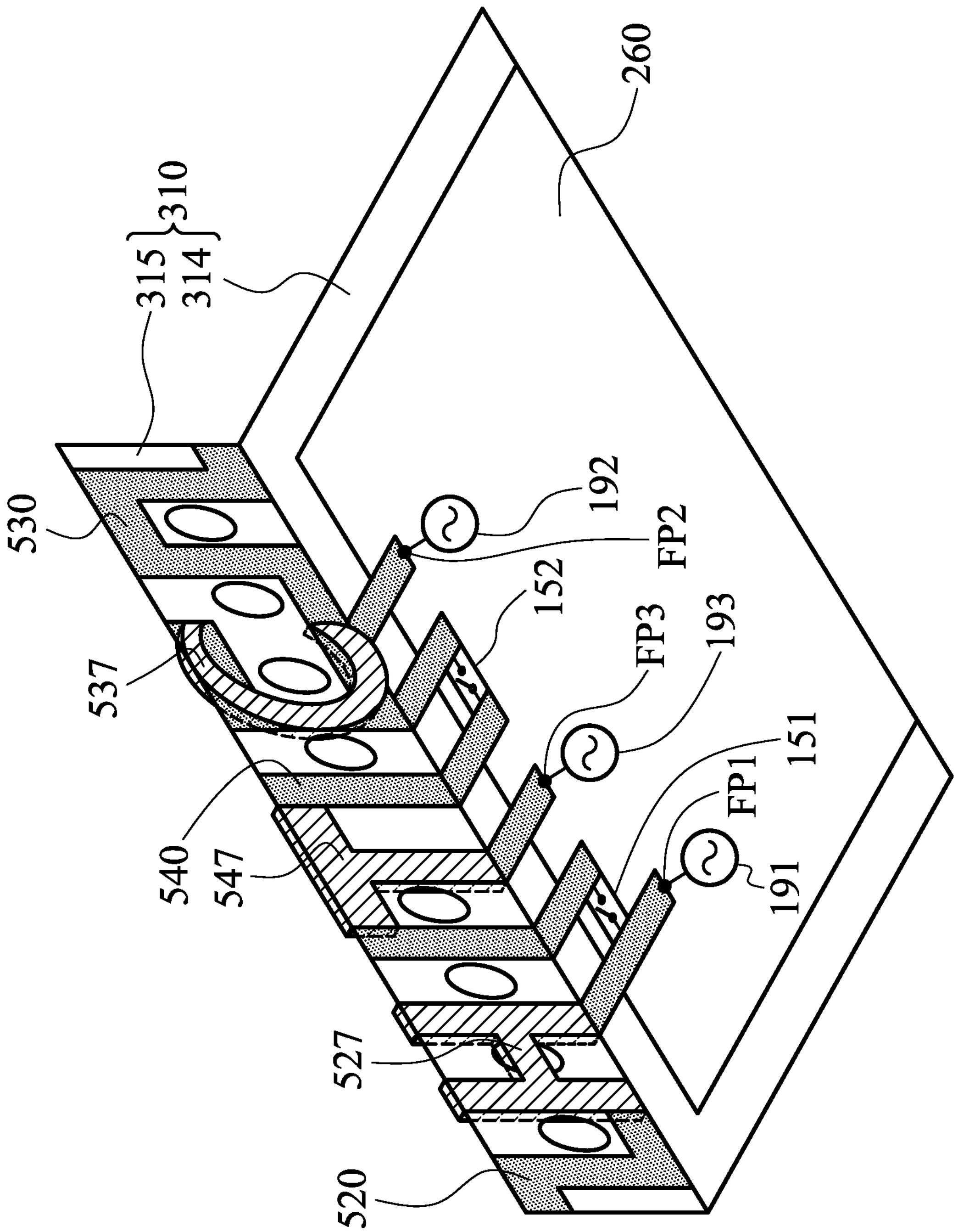
FIG. 5 is a diagram of a mobile device according to an embodiment of the invention.

FIG. 5 is a diagram of a mobile device 500 according to an embodiment of the invention. FIG. 5 is similar to FIG. 4. In the embodiment of FIG. 5, a first radiation element 520 of the mobile device 500 includes an H-shaped portion 527, a second radiation element 530 of the mobile device 500 includes a C-shaped portion 537, and a third radiation element 540 of the mobile device 500 includes a T-shaped portion 547. It should be noted that the H-shaped portion 527, the C-shaped portion 537, and the T-shaped portion 547 may extend onto an outer surface of the sidewall 315. Therefore, a user can directly observe the "HTC" trademark on the mobile device 500. In other words, the first radiation element 520, the second radiation element 530, and the third radiation element 540 using irregular designs not only excite and generate a radiation pattern of the antenna structure, but also improve the appearance of the mobile device 500. In alternative embodiments, the first radiation element 520, the second radiation element 530, and the third radiation element 540 are configured to display different styles of words, patterns or trademarks, but they are not limited thereto. Other features of the mobile device 500 of FIG. 5 are similar to those of the mobile device 400 of FIG. 4. Therefore, the two embodiments can achieve similar levels of performance.

The invention proposes a novel mobile device including an antenna structure. Compared to the conventional design, the invention has at least the advantages of small size, wide bandwidth, and low manufacturing cost, and therefore it is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-5. The invention may merely include any one or more features of any one or more embodiments of FIGS. 1-5. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device, comprising:
- a housing;
- a first radiation element, having a first feeding point;
- a second radiation element, having a second feeding point;
- a third radiation element, wherein the first radiation element, the second radiation element, and the third radiation element are distributed over the housing;
- a first switch element, closed or open, so as to selectively couple the first radiation element to the third radiation element; and
- a second switch element, closed or open, so as to selectively couple the second radiation element to the third radiation element;
- wherein an antenna structure is formed by the first radiation element, the second radiation element, and the third radiation element;
- wherein the housing comprises a sidewall, and the sidewall has a plurality of openings.

2. The mobile device as claimed in claim 1, wherein the housing further comprises a back cover, and the back cover and the sidewall are substantially perpendicular to each other.

3. The mobile device as claimed in claim 2, wherein the first radiation element, the second radiation element, and the third radiation element are mainly disposed on the sidewall.

4. The mobile device as claimed in claim 1, wherein the first radiation element, the second radiation element, and the third radiation element are substantially interleaved with the openings of the sidewall.

5. The mobile device as claimed in claim 1, wherein each of the first radiation element and the second radiation element has an inverted U-shape or a meandering shape.

6. The mobile device as claimed in claim 1, wherein the third radiation element has an M-shape.

7. The mobile device as claimed in claim 1, wherein the first radiation element comprises an H-shaped portion, the second radiation element comprises a C-shaped portion, and the third radiation element comprises a T-shaped portion.

8. The mobile device as claimed in claim 1, wherein the third radiation element comprises a first segment and a second segment, the first segment is coupled to the first switch element, and the second segment is coupled to the second switch element.

9. The mobile device as claimed in claim 8, wherein each of the first segment and the second segment has an inverted U-shape.

10. The mobile device as claimed in claim 8, further comprising:
- a third switch element, closed or open, so as to selectively couple the first segment to the second segment.

11. The mobile device as claimed in claim 10, wherein when only any two of the first switch element, the second switch element, and the third switch element are closed, the antenna structure covers a second frequency band, a third frequency band, and a fourth frequency band.

12. The mobile device as claimed in claim 10, wherein when only any one of the first switch element, the second switch element, and the third switch element is closed, the antenna structure covers a third frequency band and a fourth frequency band.

13. The mobile device as claimed in claim 10, wherein when the first switch element, the second switch element, and the third switch element are all opened, the antenna structure covers a fourth frequency band.

14. The mobile device as claimed in claim 10, further comprising:

a dielectric substrate, wherein the first switch element, the second switch element, and the third switch element are disposed on the dielectric substrate.

15. The mobile device as claimed in claim 8, wherein the first segment or the second segment further has a third feeding point.

16. The mobile device as claimed in claim 10, wherein when the first switch element, the second switch element, and the third switch element are all closed, the antenna structure covers a first frequency band, a second frequency band, a third frequency band, and a fourth frequency band.

17. The mobile device as claimed in claim 16, wherein the first frequency band is from 600 MHz to 1000 MHz.

18. The mobile device as claimed in claim 16, wherein the second frequency band is from 1400 MHz to 2700 MHz.

19. The mobile device as claimed in claim 16, wherein the third frequency band is from 3200 MHz to 5000 MHz.

20. The mobile device as claimed in claim 16, wherein the fourth frequency band is from 5000 MHz to 7200 MHz.

* * * * *